United States Patent
Hashimoto

(10) Patent No.: US 12,340,133 B2
(45) Date of Patent: Jun. 24, 2025

(54) IMAGE FORMING APPARATUS AND METHOD, IMAGE FORMING SYSTEM, AND NON-TRANSITORY COMPUTER READABLE MEDIUM

(71) Applicant: FUJIFILM Business Innovation Corp., Tokyo (JP)

(72) Inventor: Kohei Hashimoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 419 days.

(21) Appl. No.: 17/861,738

(22) Filed: Jul. 11, 2022

(65) Prior Publication Data

US 2023/0297304 A1 Sep. 21, 2023

(30) Foreign Application Priority Data

Mar. 18, 2022 (JP) .................................. 2022-044567

(51) Int. Cl.
*G06F 3/12* (2006.01)

(52) U.S. Cl.
CPC .......... *G06F 3/1247* (2013.01); *G06F 3/1222* (2013.01); *G06F 3/1238* (2013.01); *G06F 3/1274* (2013.01)

(58) Field of Classification Search
None
See application file for complete search history.

(56) References Cited

U.S. PATENT DOCUMENTS

| | | | |
|---|---|---|---|
| 7,684,064 B2 | 3/2010 | Kimura et al. | |
| 2003/0107771 A1* | 6/2003 | Shibata | H04N 1/00912 382/100 |
| 2007/0127077 A1* | 6/2007 | Tamura | H04N 1/32144 358/540 |
| 2008/0158604 A1* | 7/2008 | Mochizuki | G06K 15/1822 358/1.17 |
| 2009/0174900 A1* | 7/2009 | Shigehisa | H04N 1/4413 358/1.15 |
| 2010/0134822 A1 | 6/2010 | Kimura et al. | |

FOREIGN PATENT DOCUMENTS

| | | |
|---|---|---|
| JP | 2002-187317 A | 7/2002 |
| JP | 2006-146944 A | 6/2006 |
| JP | 2011-93127 A | 5/2011 |

* cited by examiner

*Primary Examiner* — Thomas D Lee
(74) *Attorney, Agent, or Firm* — Oliff PLC

(57) ABSTRACT

An image forming apparatus includes a processor configured to: obtain print information including a setting of a predetermined specific page and predetermined verification information, the predetermined specific page being indicated by print data which is to be subjected to printing processing; convert the print data into image data in a printable format for each output page; embed the predetermined verification information into the image data of an output page including the predetermined specific page; request a user to provide the verification information so as to obtain the verification information when printing the output page with the embedded verification information; and execute printing processing if the embedded verification information and the obtained verification information match each other.

20 Claims, 11 Drawing Sheets

IMAGE FORMING APPARATUS AND METHOD, IMAGE FORMING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-044567 filed Mar. 18, 2022.

BACKGROUND

(i) Technical Field

The present disclosure relates to an image forming apparatus and method, an image forming system, and a non-transitory computer readable medium.

(ii) Related Art

Japanese Unexamined Patent Application Publication No. 2011-93127 discloses a control device integrated in a printer or installed at a position at which the control device can obtain output from the printer. The control device includes an authentication function, a power control function, and a virtual host function. The authentication function receives authentication information provided at a position very close to the control device, and based on the received authentication information, the authentication function authenticates the execution of a print job sent from a host device via a communication network and to be output from the printer. The power control function starts supplying power to the printer after the print job is authenticated by the authentication function. The virtual host function provides the print job to the printer after the print job is authenticated by the authentication function.

Japanese Unexamined Patent Application Publication No. 2006-146944 discloses a print system including a printer that can receive multiple print jobs. When printing processing for a print job is interrupted in the printer due to some failure, data of the print job is stored in a storage in a state in which the data is encrypted. After the printer is recovered from the failure and authentication data required for restarting printing of the print job is input, the encrypted data is decrypted and printing processing for the print job is restarted in the printer.

Japanese Unexamined Patent Application Publication No. 2002-187317 proposes the following technology. In a print system that can execute secure printing, secure printing is set for a print job page by page, which is generated in a host computer. In a printer, for a print job for which secure printing is set page by page, the pages other than those for which secure printing is set are output without performing user authentication, and after user authentication is performed, the pages for which secure printing is set are output.

SUMMARY

In some image forming apparatuses, after authentication is performed at the beginning of printing, printing of a document is started. After authentication, all the pages of the document are printed and output. Even when a specific page of the document contains sensitive information or a user wishes to check the print conditions before printing a specific page, all the pages are printed and output by the authentication performed at the start of printing. When printing a specific page, a user may not always be around the image forming apparatus. If printing is performed with an image forming apparatus used by many unspecified users, information may leak if a user leaves the image forming apparatus before printing is completed.

Aspects of non-limiting embodiments of the present disclosure relate to providing of an image forming apparatus and method, an image forming system, and a non-transitory computer readable medium that can make it possible to guarantee that a specific page is printed if the integrity of verification information is verified.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a processor configured to: obtain print information including a setting of a predetermined specific page and predetermined verification information, the predetermined specific page being indicated by print data which is to be subjected to printing processing; convert the print data into image data in a printable format for each output page; embed the predetermined verification information into the image data of an output page including the predetermined specific page; request a user to provide the verification information so as to obtain the verification information when printing the output page with the embedded verification information; and execute printing processing if the embedded verification information and the obtained verification information match each other.

BRIEF DESCRIPTION OF THE DRAWINGS

An exemplary embodiment of the present disclosure will be described in detail based on the following figures, wherein.

DETAILED DESCRIPTION

Figure 1:
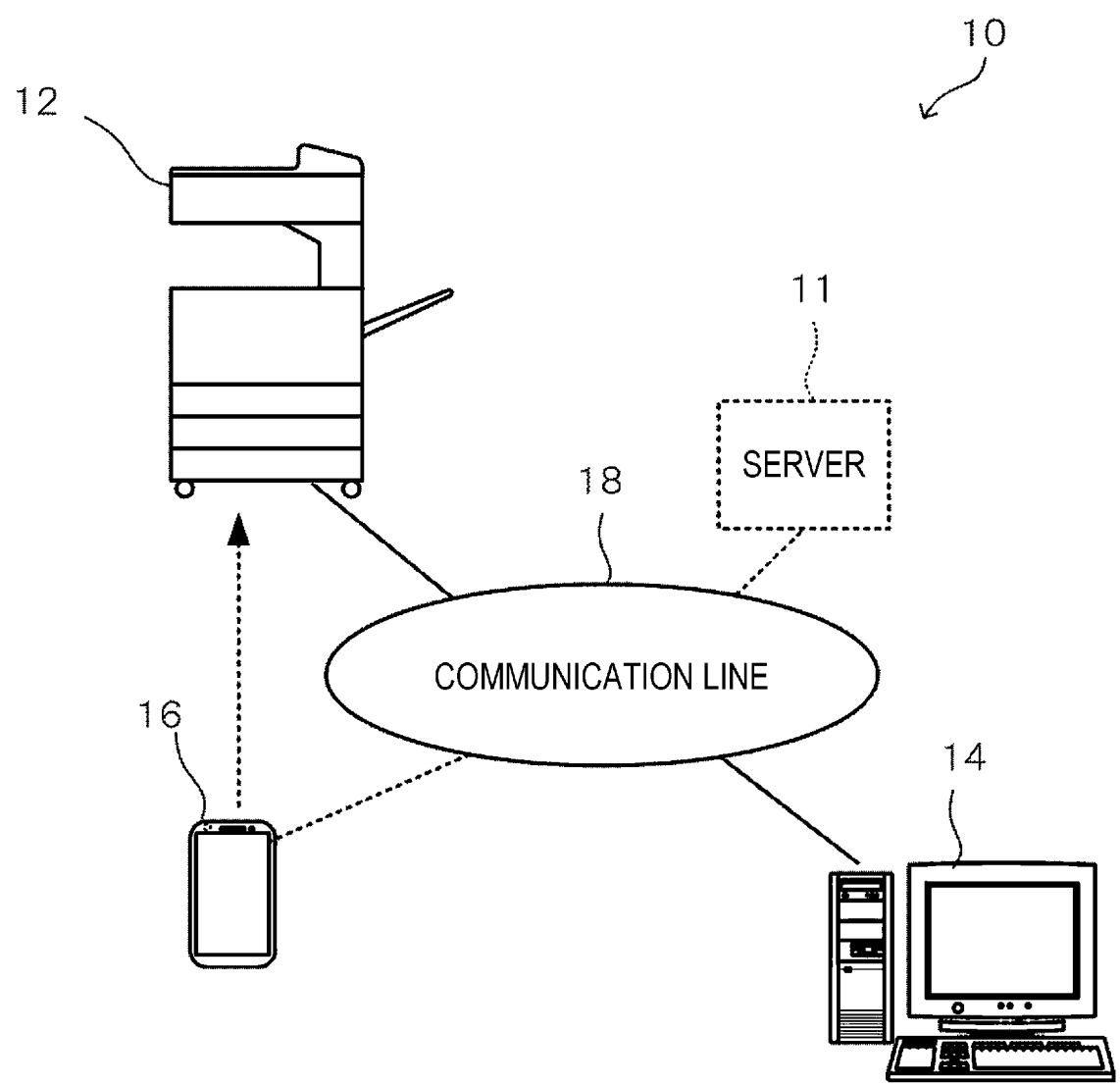
FIG. 1 is a schematic diagram illustrating an image forming system according to the exemplary embodiment.

An example of the exemplary embodiment will be described below in detail with reference to the accompanying drawings. In the exemplary embodiment, an image forming system in which an image forming apparatus and a client computer, which serves as an information processing apparatus, are connected to each other via a communication line will be discussed below by way of example. As the communication line, various networks may be used. FIG. 1 is a schematic diagram illustrating an image forming system 10 according to the exemplary embodiment.

As shown in FIG. 1, the image forming system 10 includes an image forming apparatus 12 and a client computer 14. The image forming apparatus 12 and the client computer 14 are connected to each other via a communication line 18, such as a local area network (LAN), a wide area network (WAN), the internet, and an intranet. The image forming apparatus 12 and the client computer 14 can send and receive various types of data to and from each other via the communication line 18. In the exemplary embodiment, the client computer 14 sends a print instruction to the image forming apparatus 12, and the image forming apparatus 12 forms an image in accordance with the print instruction. Although one image forming apparatus 12 and one client computer 14 are shown in FIG. 1, plural image forming apparatuses 12 and/or plural client computers 14 may be provided. In the exemplary embodiment, a print instruction is given to the image forming apparatus 12 from the client computer 14. However, a print instruction may be provided from a mobile terminal apparatus 16 to the image forming apparatus 12 via the communication line 18, as indicated by the dotted lines in FIG. 1. A print instruction may be provided from the mobile terminal apparatus 16 directly to the image forming apparatus 12 via short-range wireless communication, such as Wi-Fi (registered trademark) and Bluetooth (registered trademark). The image forming system 10 may also include a server 11, as indicated by the dotted lines in FIG. 1, and an image forming request may be sent to the image forming apparatus 12 from at least one of the client computer 14 and the mobile terminal apparatus 16 via the server 11.

The image forming apparatus 12 has multiple functions, such as an image forming function of performing image forming processing based on data received via the communication line 18, a read function of reading a document and generating image information indicating the read document, a copy function of copying an image recorded on a document onto a sheet, a fax function of sending and receiving various types of data via a telephone line (not shown), a transfer function of transferring document information, such as image information, generated as a result of a function such as the read function reading a document, and a store function of storing document information, such as image information, generated as a result of a function such as the read function reading a document.

In the following description, processing or a set of processing operations to be executed by the image forming apparatus 12 to implement a predetermined function will be called a job. In the following description, image forming performed by the image forming apparatus 12 may also be called printing.

Figure 2:
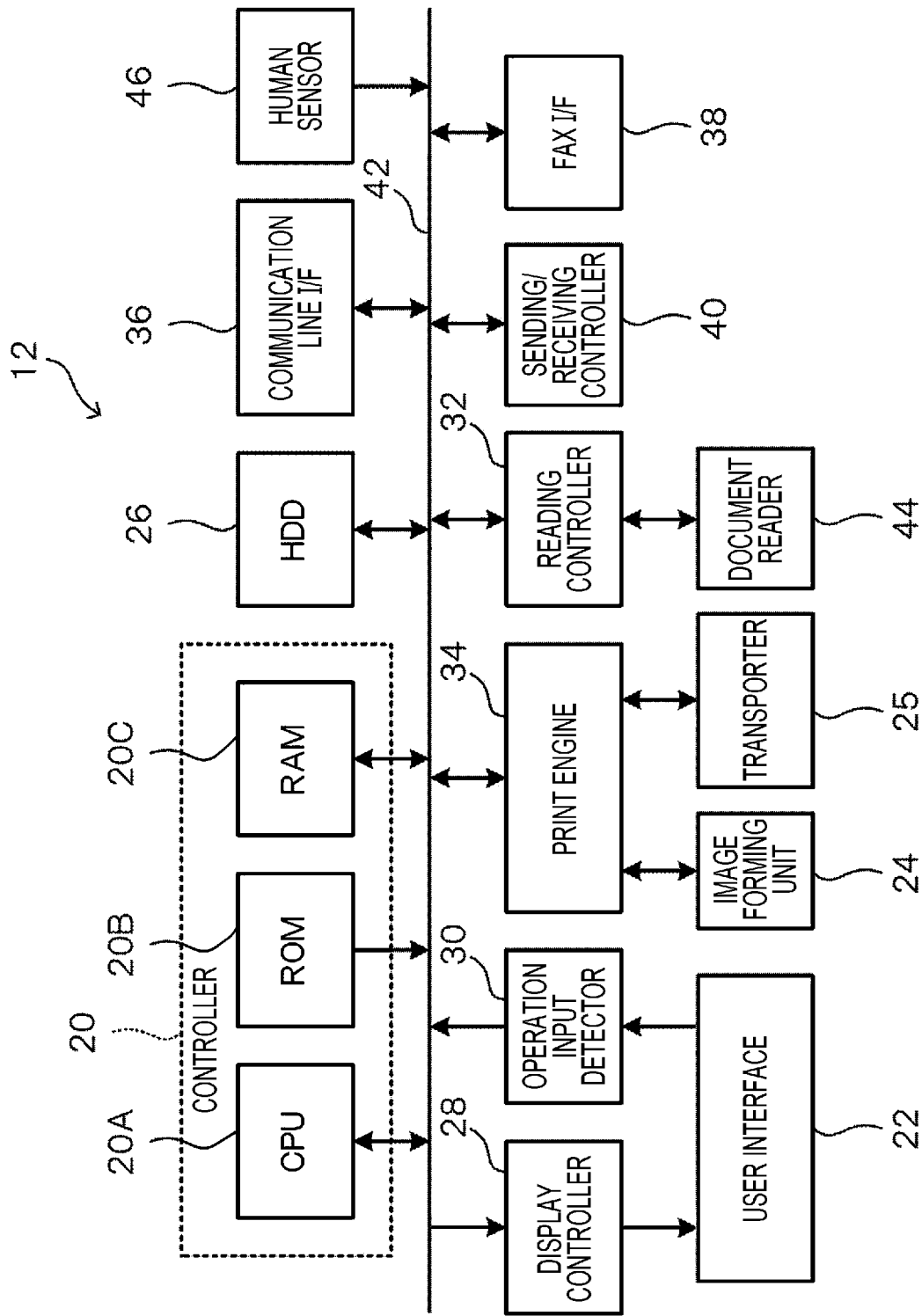
FIG. 2 is a block diagram illustrating major parts of an electrical system of an image forming apparatus in the image forming system according to the exemplary embodiment.

FIG. 2 is a block diagram illustrating major parts of the electrical system of the image forming apparatus 12 in the image forming system 10 according to the exemplary embodiment.

As shown in FIG. 2, the image forming apparatus 12 includes a controller 20 having a central processing unit (CPU) 20A, a read only memory (ROM) 20B, and a random access memory (RAM) 20C. The CPU 20A, which is an example of a processor, controls the entire operation of the image forming apparatus 12. The RAM 20C is used as a work area, for example, for the CPU 20A to execute various programs. In the ROM 20B, various control programs and various parameters, for example, are stored in advance. In the image forming apparatus 12, the CPU 20A, the ROM 20B, and the RAM 20C of the controller 20 are electrically connected to each other via a system bus 42.

The image forming apparatus 12 includes a hard disk drive (HDD) 26, a display controller 28, and an operation input detector 30. The HDD 26 stores various types of data and application programs. The display controller 28 is connected to a user interface 22 to control the displaying of various screens, such as operation screens, on a display of the user interface 22. The operation input detector 30 is also connected to the user interface 22 to detect an operation instruction input via the user interface 22. In the image forming apparatus 12, the HDD 26, the display controller 28, and the operation input detector 30 are electrically connected to the system bus 42. Although the HDD 26 is used as a storage device in the exemplary embodiment, another non-volatile storage, such as a flash memory, may alternatively be used as the storage device.

The image forming apparatus 12 also includes a reading controller 32 and a print engine 34. The reading controller 32 controls an optical image-reading operation performed by a document reader 44 and a document feeding operation performed by a document feeder. The print engine 34 controls image forming processing executed by an image forming unit 24 and the transporting operation of a sheet to the image forming unit 24 performed by a transporter 25. The image forming apparatus 12 also includes a communication line interface (communication line I/F) 36, a fax interface (fax I/F) 38, a sending/receiving controller 40, and a human sensor 46. The communication line I/F 36 is connected to the communication line 18 and sends and receives communication data to and from other external devices, such as the client computer 14, connected to the communication line 18. The fax I/F 38 is connected to a telephone line (not shown) and sends and receives fax data to and from a fax device connected to the telephone line. The sending/receiving controller 40 controls sending/receiving of fax data performed via the fax I/F 38. The human sensor 46 detects people around the image forming apparatus 12. In the image forming apparatus 12, the sending/receiving controller 40, reading controller 32, print engine 34, communication line I/F 36, fax I/F 38, and human sensor 46 are electrically connected to the system bus 42.

With the above-described configuration, by using the CPU 20A, the image forming apparatus 12 makes access to each of the RAM 20C, the ROM 20B, and the HDD 26. By using the CPU 20A, the image forming apparatus 12 performs the following various control operations by way of example: displaying of operation screens and information, such as various messages, on the display of the user interface 22 via the display controller 28; activation of the document reader 44 and the document feeder via the reading controller 32; activation of the image forming unit 24 and the transporter 25 via the print engine 34; sending/receiving of communication data via the communication line I/F 36; and sending/receiving of fax data via the fax I/F 38 under the control of the sending/receiving controller 40. By using the CPU 20A, the image forming apparatus 12 also identifies the content of operation performed on the user interface 22, based on operation information detected by the operation input detector 30, and then performs various control operations based on the identified content of operation.

As in the controller 20, the print engine 34 may include a CPU, a ROM, and a RAM, for example, and may execute processing, which will be discussed later, as a result of the CPU executing a program. Alternatively, the print engine 34 may be implemented as a result of the CPU 20A of the controller 20 executing the program.

Major parts of the electrical system of the client computer 14 in the image forming system 10 according to the exemplary embodiment will be discussed below with reference to the block diagram of FIG. 3.

Figure 3:
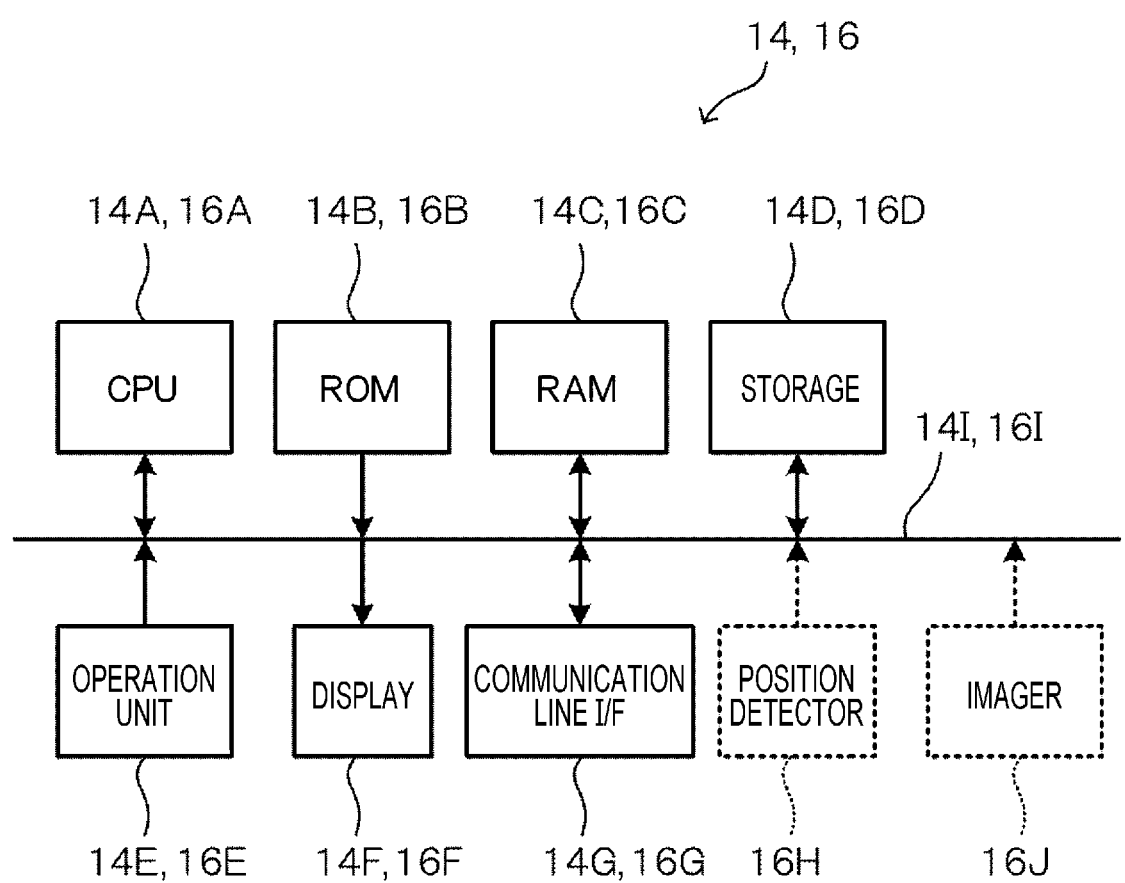
FIG. 3 is a block diagram illustrating major parts of an electrical system of a client computer in the image forming system according to the exemplary embodiment.

As shown in FIG. 3, the client computer 14 in the exemplary embodiment includes a CPU 14A, a ROM 14B, a RAM 14C, a storage 14D, an operation unit 14E, a display 14F, and a communication line interface (I/F) 14G. The CPU 14A, which is an example of a processor, controls the entire operation of the client computer 14. In the ROM 14B, various control programs and various parameters, for example, are stored in advance. The RAM 14C is used as a work area, for example, for the CPU 14A to execute various programs. In the storage 14D, various types of data and application programs, for example, are stored. The operation unit 14E is used for inputting various items of information. The display 14F is used for displaying various items of information. The communication line I/F 14G is connected to the communication line 18 and sends and receives various types of data to and from other devices connected to the communication line 18. The communication line I/F 14G may be able to directly communicate with other devices by using various known wireless communication systems. The above-described elements of the client computer 14 are electrically connected to each other via a system bus 141. Although the storage 14D is used as a storage device in the exemplary embodiment, another non-volatile storage, such as an HDD or a flash memory, may alternatively be used as the storage device.

With the above-described configuration, by using the CPU 14A, the client computer 14 makes access to each of the ROM 14B, the RAM 14C, and the storage 14D. By using the CPU 14A, the client computer 14 also obtains various types of data via the operation unit 14E, displays various items of information on the display 14F, and performs control to send and receive communication data via the communication line I/F 14G.

As described above, the mobile terminal apparatus 16 may be used to provide a print instruction to the image forming apparatus 12. Basically, the mobile terminal apparatus 16 is a typical computer. The mobile terminal apparatus 16 includes a CPU 16A, a ROM 16B, a RAM 16C, a storage 16D, an operation unit 16E, a display 16F, and a communication line I/F 16G, as in the client computer 14 shown in FIG. 3. A detailed explanation of the mobile terminal apparatus 16 will thus be omitted. As elements which are not included in the client computer 14, the mobile terminal apparatus 16 includes a position detector 16H and an imager 16J, such as a camera. The position detector 16H detects the position of the mobile terminal apparatus 16 by using a global positioning system (GPS).

In the image forming system 10 of the exemplary embodiment configured as described above, printing procedures performed by the image forming apparatus 12 in response to a print request received from the client computer 14 will be described below.

Figure 4:
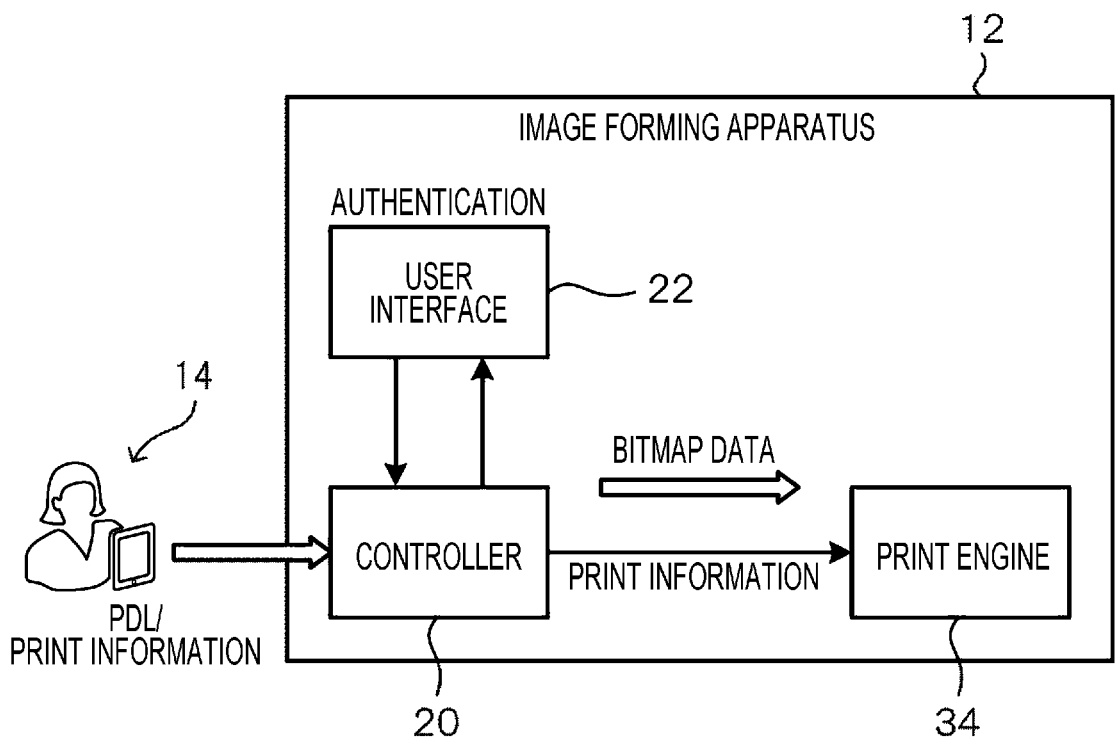
FIG. 4 is a schematic diagram for explaining a regular printing procedure performed by the image forming apparatus in the image forming system according to the exemplary embodiment when the client computer has requested the image forming apparatus to perform printing.

A regular printing procedure will first be discussed below. FIG. 4 is a schematic diagram for explaining the regular printing procedure performed by the image forming apparatus 12 in the image forming system 10 according to the exemplary embodiment when the client computer 14 has requested the image forming apparatus 12 to perform printing.

The client computer 14 requests the image forming apparatus 12 to perform printing by sending a print job including print data, such as page description language (PDL) data, and print information on various printing conditions, such as the number of print copies, to the image forming apparatus 12.

A user then approaches the image forming apparatus 12 and performs authentication by using an integrated circuit (IC) card and operating the user interface 22, for example. Then, the user operates the user interface 22 to specify a print job to be subjected to printing and to give a print instruction. At this time, the user may omit performing authentication.

Then, in response to the print job received from the client computer 14, the controller 20 executes decomposing processing on the print data in accordance with the print information included in the print job. Decomposing is processing for converting print data, such as PDL data, into bitmap data, which is an example of image data in a format that can be printed by the image forming apparatus 12. If N-up printing, which is to print multiple pages on one output page, is set in the print information, when executing decomposing processing, the controller 20 converts the print data into bitmap data which allows multiple pages of a document to be printed onto one output page. If double-sided printing is set in the print information, the controller 20 converts the print data into bitmap data which allows two pages of the document to be printed on front and back sides of one output page. The controller 20 then sends the generated bitmap data and the print information to the print engine 34.

In response to the bitmap data and the print information received from the controller 20, the print engine 34 performs control in accordance with the content of the print information to cause the image forming unit 24 and the transporter 25 to form an image on a sheet and to output the sheet.

In the regular printing procedure, authentication is performed at the beginning of printing, and after authentication, all the pages of a document are printed and output. That is, even when a specific page of the document contains sensitive information or a user wishes to check the print conditions before printing a specific page, all the pages are printed and output by the authentication performed at the start of printing. When printing a specific page, such as a page containing sensitive information or a page that a user wishes to check before printing, the user may not always be around the image forming apparatus. When printing is performed with an image forming apparatus used by many unspecified users, information may leak if the user leaves the image forming apparatus before printing is completed.

Figure 5:
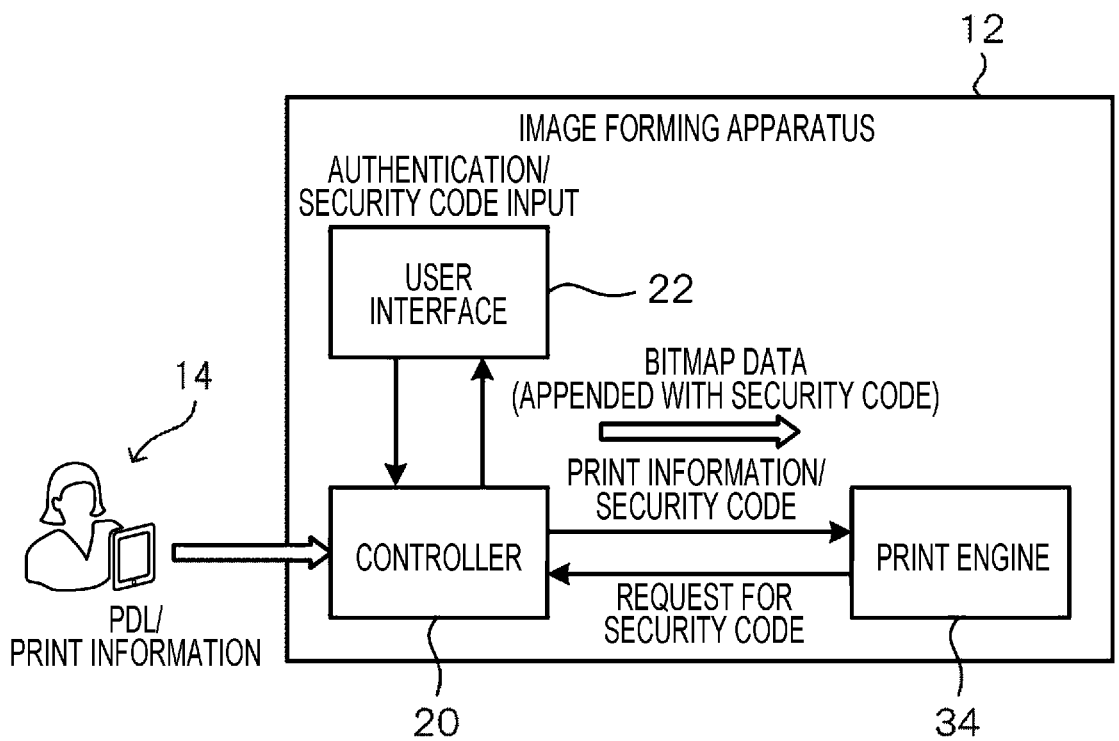
FIG. 5 is a schematic diagram for explaining processing executed by the image forming apparatus in the image forming system according to the exemplary embodiment when the client computer has requested the image forming apparatus to perform secure (authentication) printing.

To address this issue, in the image forming system 10 of the exemplary embodiment, secure (authentication) printing is performed to ask for authentication when printing a specific page. Secure (authentication) printing will be explained below. FIG. 5 is a schematic diagram for explaining processing executed by the image forming apparatus 12 of the image forming system 10 when the client computer 14 has requested the image forming apparatus 12 to perform secure (authentication) printing.

When sending a print request from an external device, such as the client computer 14, a user sets a specific page, such as a page containing sensitive information or a page that a user wishes to check before printing, and verification information, such as a security code, as part of print information. Then, the user sends a print job including such print information and print data to the image forming apparatus 12. A description will be given below, assuming that a page containing sensitive information is used as an example of a specific page, and a security code, such as a password, is used as an example of verification information.

When converting print data into bitmap data by executing decomposing processing, for a page containing sensitive information set as a specific page, the controller 20 of the image forming apparatus 12 embeds a security code into the bitmap data of this page and sends the bitmap data to the print engine 34, as shown in FIG. 5. For example, in the case of N-up printing, if one of multiple pages integrated into one output page contains sensitive information, the controller 20 embeds a security code into bitmap data of this output page. When printing the output page having the security code embedded into the bitmap data, the print engine 34 requests the controller 20 to provide the security code. As a result of a user inputting the security code into the user interface 22, the print engine 34 verifies the input security code against the security code embedded in the bitmap data. If the two security codes match each other, the print engine 34 prints the print data represented by the bitmap data. If the security code is not input into the user interface 22 before the page containing sensitive information is printed, printing is suspended. The user is thus required to be around the image forming apparatus 12 when the page containing sensitive information is printed. In the case of N-up printing, the print engine 34 requests the controller 20 to input the security code immediately before an output page including a page containing sensitive information is printed. The user is thus required to be around the image forming apparatus 12 when the output page including the page containing sensitive information is printed.

Figure 6:
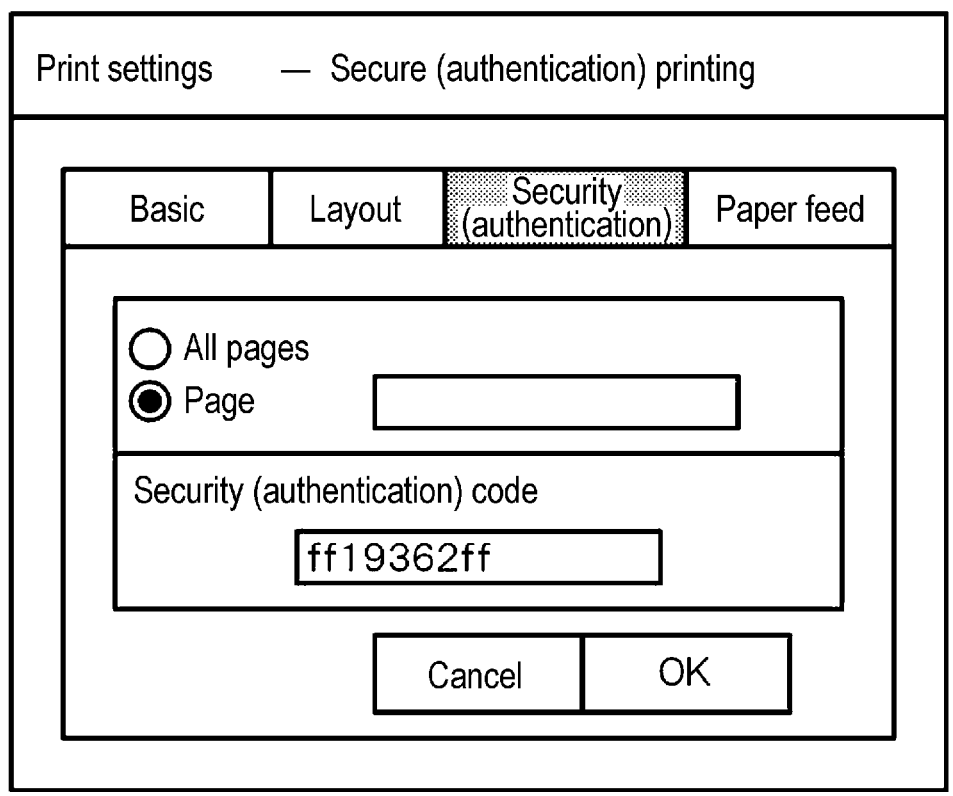
FIG. 6 illustrates an example of a print setting screen to be displayed for a sender of a print job, such as for a client computer, when the client computer requests the image forming apparatus to perform secure (authentication) printing.

FIG. 6 illustrates an example of a print setting screen to be displayed for a sender of a print job, such as for the client computer 14, when the client computer 14 requests the image forming apparatus 12 to perform secure (authentication) printing.

On the print setting screen shown in FIG. 6, by using a security (authentication) tab, a user selects whether all pages or a certain page is handled as a page containing sensitive information. The user then inputs a security code, which is to be verified immediately before a page containing sensitive information is printed, into a security (authentication) code field. In the example in FIG. 6, "ff19362ff" is set as the security (authentication) code.

Figure 7:
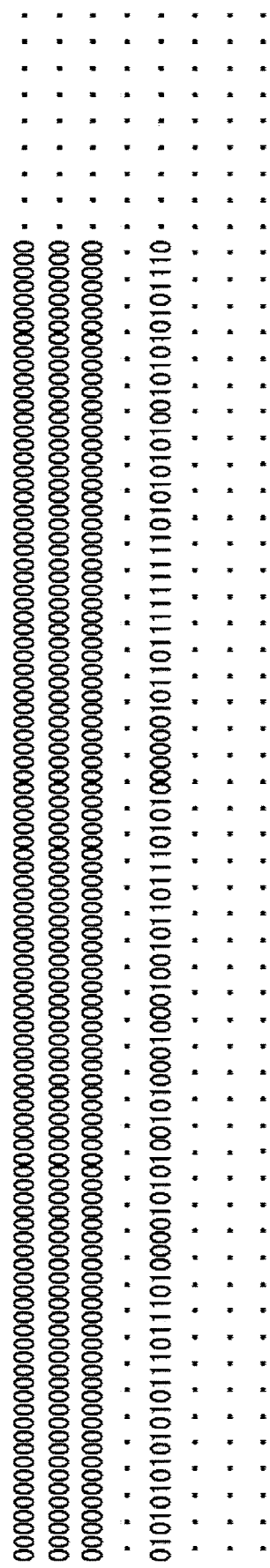
FIG. 7 illustrates an example of bitmap data subjected to decomposing processing in regular printing.
Figure 8:
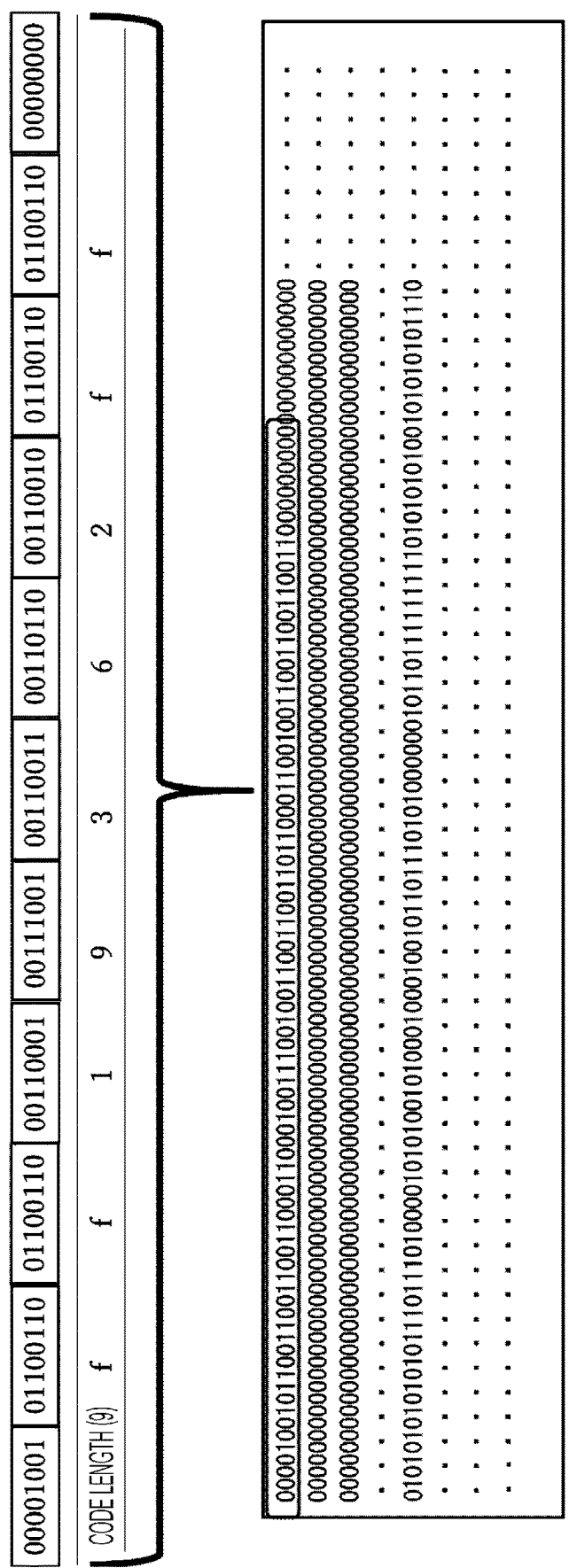
FIG. 8 illustrates an example of bitmap data subjected to decomposing processing in secure (authentication) printing.

Decomposing processing executed by the controller 20 will be explained below through illustration of specific examples. FIG. 7 illustrates an example of bitmap data subjected to decomposing processing in regular printing. FIG. 8 illustrates an example of bitmap data subjected to decomposing processing in secure (authentication) printing.

After receiving print data and print information set on the print setting screen, the controller 20 embeds a security code into bitmap data subjected to decomposing processing.

The bitmap data shown in FIG. 7 and that in FIG. 8 are expressed in binary format. In actual bitmap data subjected to decomposing processing, information, such as the data size and the format, is indicated at the head of the bitmap data. However, only print data is shown in FIGS. 7 and 8.

Typically, the first line of print data subjected to decomposing processing is outside the print area and is thus entirely expressed by 0, as shown in FIG. 7.

In the exemplary embodiment, the controller 20 overwrites the first ten bytes of the print data with a security code, so that the security code can be embedded into the decomposed data.

More specifically, if the above-described security code "ff19362ff" is to be embedded into the decomposed data, as shown in FIG. 8, the first byte is used to write a code size, and "9", which is the number of characters, is embedded into the first byte. Then, the individual characters of the security code "ff19362ff" are embedded into the second through tenth bytes, respectively. The bitmap data into which the security code "ff19362ff" is embedded and is expressed in binary format is shown in FIG. 8.

Specific processing to be executed by the image forming apparatus 12 of the above-configured image forming system 10 of the exemplary embodiment will be described below.

Figure 9:
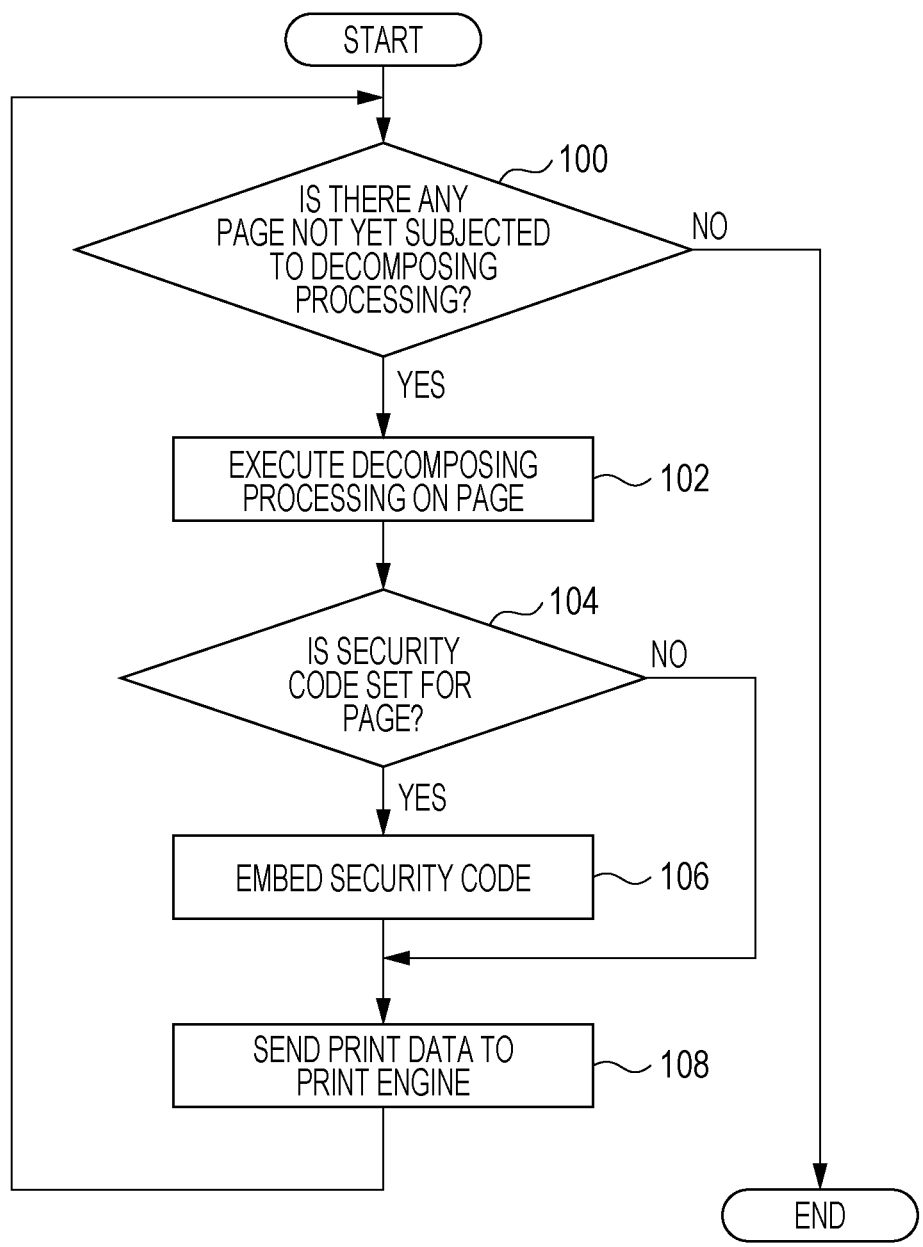
FIG. 9 is a flowchart illustrating an example of processing executed by a controller of the image forming apparatus according to the exemplary embodiment.

Specific processing from the execution of decomposing processing by the controller 20 until sending of the resulting bitmap data to the print engine 34 will first be discussed below. FIG. 9 is a flowchart illustrating an example of processing executed by the controller 20 of the image forming apparatus 12 according to the exemplary embodiment. The processing in FIG. 9 is implemented, for example, as a result of the CPU 20A executing a program prestored in the ROM 20B or the HDD 26.

In step 100, the controller 20 judges whether there is any page which is not yet subjected to decomposing processing. If such a page is found, the controller 20 proceeds to step 102. If no such page is found, the controller 20 terminates the processing.

In step 102, the controller 20 executes decomposing processing on the page found in step 100 and proceeds to step 104. In step 102, the controller 20 executes processing for converting print data into bitmap data. If N-up printing is set, the controller 20 converts the print data into bitmap data which allows multiple pages of a document to be printed onto one output page. If double-sided printing is set, the controller 20 converts the print data into bitmap data which allows two pages of the document to be printed on front and back sides of one output page.

In step 104, the controller 20 judges whether the page subjected to decomposing processing is a page for which a security code is set. If the result of step 104 is YES, the controller 20 proceeds to step 106. If the result of step 104 is NO, the controller 20 proceeds to step 108.

In step 106, the controller 20 executes embedding processing for embedding the security code into the bitmap data and then proceeds to step 108. That is, the security code is embedded into the bitmap data subjected to decomposing processing, as shown in FIG. 8.

In step 108, the controller 20 sends the print data to the print engine 34 and returns to step 100 and re-executes the above-described processing.

Specific processing executed by the print engine 34 from receiving of the print data subjected to decomposing processing until printing of the print data will now be described below.

The print engine 34 receives the bitmap data and print information from the controller 20 and stores them in a buffer memory, for example. The print engine 34 then outputs the print data page by page in accordance with the performance of the print engine 34 (30 pages per minute, for example).

Figure 10:
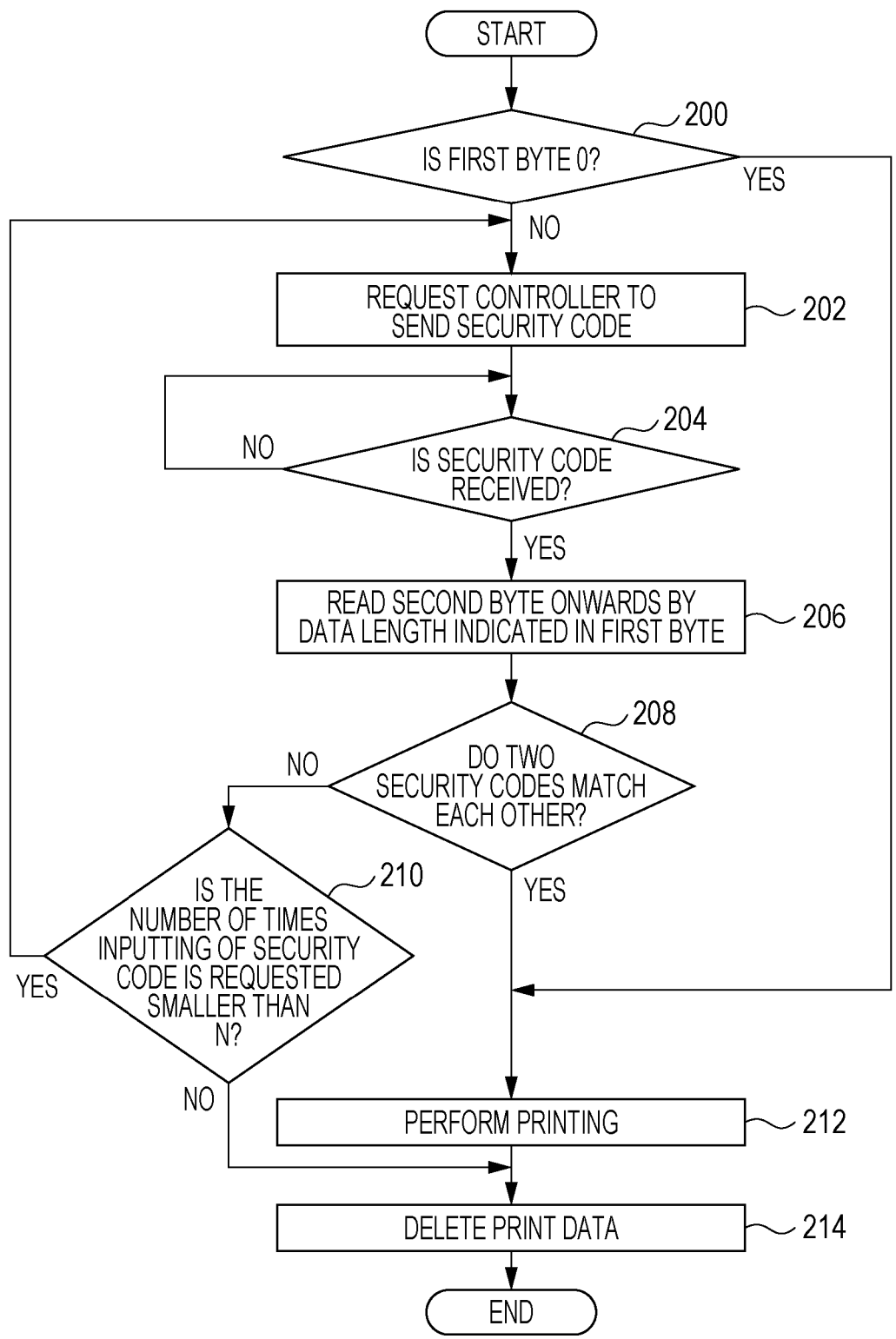
FIG. 10 is a flowchart illustrating an example of processing executed by a print engine of the image forming apparatus according to the exemplary embodiment.

FIG. 10 is a flowchart illustrating an example of processing executed by the print engine 34 of the image forming apparatus 12 according to the exemplary embodiment. The processing in FIG. 10 is implemented, for example, as a result of the CPU 20A of the controller 20 or the CPU of the print engine 34 executing a program prestored in the print engine 34 or the HDD 26.

In step 200, the print engine 34 judges whether the first byte of the bitmap data is 0, that is, whether a security code is embedded into the bitmap data. If a security code is embedded, the result of step 200 is YES and the print engine 34 proceeds to step 202. If a security code is not embedded, the result of step 200 is NO and the print engine 34 proceeds to step 212.

Figure 11:
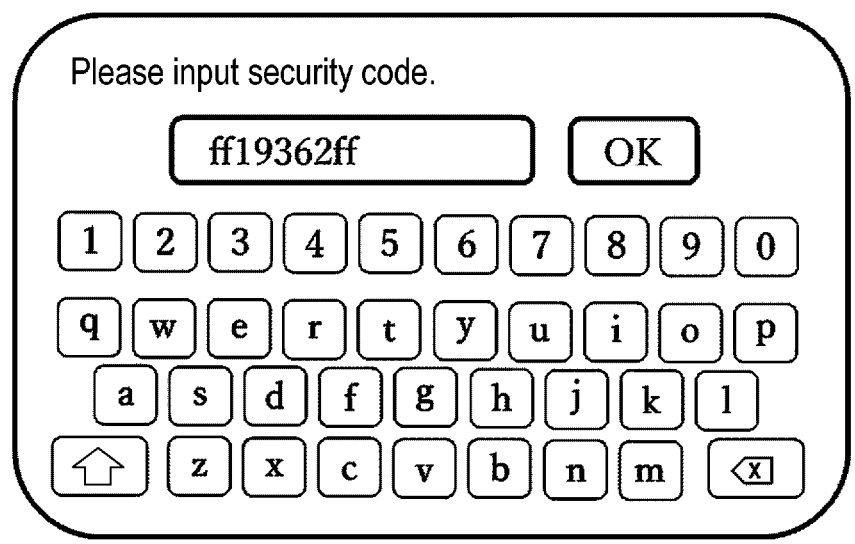
FIG. 11 illustrates an example of a screen for inputting a security code displayed on a user interface of the image forming apparatus.

In step 202, the print engine 34 requests the controller 20 to send a security code and proceeds to step 204. For example, as shown in FIG. 11, the controller 20 displays a screen for inputting a security code on the user interface 22 to instruct the user to input a security code. FIG. 11 illustrates an example of a screen for inputting a security code displayed on the user interface 22 of the image forming apparatus 12.

In step 204, it is determined whether the print engine 34 has received a security code from the controller 20, that is, whether a security code input on the user interface 22 is received. The print engine 34 waits until the result of step 204 becomes YES and then proceeds to step 206.

In step 206, the print engine 34 reads the second byte onwards by a length equal to the data size indicated in the first byte and then proceeds to step 208. That is, in step 206, the print engine 34 reads the head of the bitmap data into which the security code is embedded.

In step 208, the print engine 34 checks the security code received in step 204 against the security code embedded into the bitmap data and judges whether the two security codes match each other. If the result of step 208 is NO, the print engine 34 proceeds to step 210. If the result of step 208 is YES, the print engine 34 proceeds to step 212.

In step 210, the print engine 34 determines whether the number of times the print engine 34 has requested the controller 20 to send the security code is smaller than a predetermined number N. If the result of step 210 is YES, the print engine 34 returns to step 202 and repeats the above-described processing. If the result of step 210 is NO, the print engine 34 proceeds to step 214.

In step 212, the print engine 34 performs printing processing and proceeds to step 214. In step 212, the print engine 34 executes printing processing based on the bitmap data subjected to decomposing processing performed by the controller 20.

In step 214, the print engine 34 deletes the print data and completes the processing.

As a result of executing the above-described processing, immediately before an output page including a page containing sensitive information is printed, inputting of a security code is requested and printing is suspended until the security code is received. A user is thus required to be around the image forming apparatus 20 when printing a page containing sensitive information.

In the exemplary embodiment, even if bitmap data becomes inconsistent with print information when they are sent to the print engine 34, before a page containing sensitive information is printed, printing is temporarily stopped and verification of a security code is reliably performed.

Figure 12:
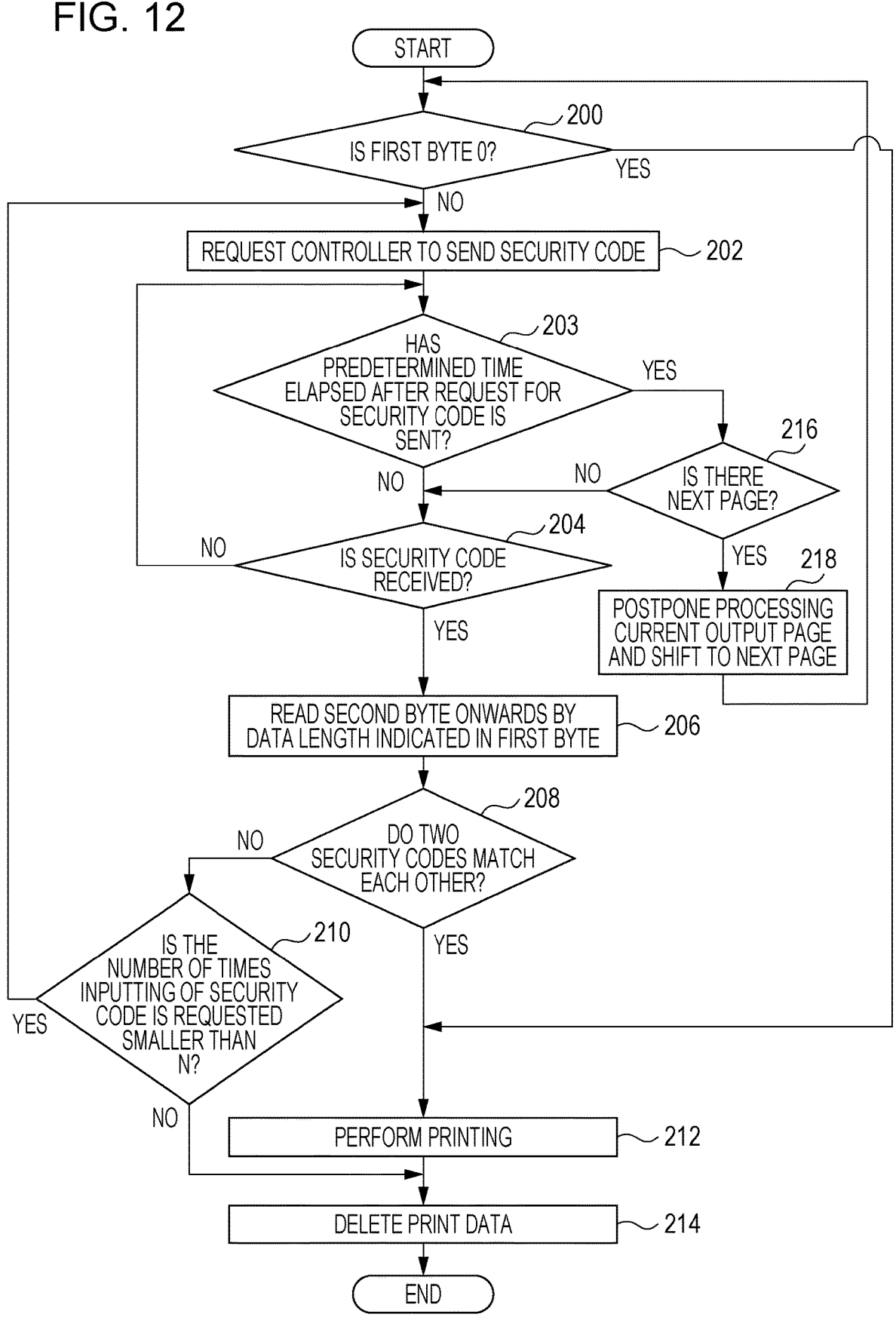
FIG. 12 is a flowchart illustrating a modified example of processing executed by the print engine of the image forming apparatus according to the exemplary embodiment.

A modified example of processing executed by the print engine 34 will be discussed below. FIG. 12 is a flowchart illustrating a modified example of processing executed by the print engine 34 of the image forming apparatus 12 according to the exemplary embodiment.

In the processing in FIG. 10, in step 204, the print engine 34 waits until a security code is input. In the modified example, if a security code is not input even after the lapse of a predetermined time, printing of the current page is postponed and printing processing for the next page is started.

In the processing shown in FIG. 12, steps 203, 216, and 218 are added to steps of the processing in FIG. 10.

After a request for inputting a security code is sent to the controller 20 in step 202, the print engine 34 determines in step 203 whether a predetermined time has elapsed after a request for inputting a security code is sent. If the result of step 203 is YES, the print engine 34 proceeds to step 216. If the result of step 203 is NO, the print engine proceeds to step 204.

In step 216, the print engine 34 determines whether there is another output page next to the current output page. If the result of step 216 is NO, the print engine 34 proceeds to step 204. If the result of step 216 is YES, the print engine proceeds to step 218.

In step 218, the print engine 34 postpones executing printing processing for the current output page and shifts to the next output page. The print engine 34 then returns to step 200 and repeats the above-described processing.

As a result of executing the above-described processing, if a security code is not input after the lapse of the predetermined time, printing processing for the current output page including a page containing sensitive information is postponed, and the next page is subjected to printing processing.

In the above-described exemplary embodiment, when printing a page containing sensitive information, if the number of times a request for a security code is sent reaches or exceeds a threshold, print data is deleted. However, the condition for deleting print data is not restricted to this. For example, it may be determined in step 210 whether the time elapsed from when a request for a security code is sent reaches a predetermined time. If the predetermined time is reached, print data may be deleted. Alternatively, it may be determined in step 210 whether at least one of the number of times a request for a security code is sent and the time elapsed from when a request for a security code is sent reaches or exceeds a predetermined threshold, and if this condition is satisfied, print data may be deleted.

In the above-described exemplary embodiment, a user sets a specific page and verification information by using the client computer 14. However, a specific page and verification information may be set in a different manner. For example, preset text, such as "Internal Use Only", or a preset mark may be placed in a fixed position (on the top right, for example) of the layout of a specific page, such as a page including a page containing sensitive information. Then, when the client computer 14 instructs the image forming apparatus 12 to perform printing, it may detect such text or such a mark from print data so as to automatically identify a specific page, such as a page including a page containing sensitive information. For verification information, instead of a security code, information for authenticating a user, such as user information or biometric information, may be obtained and be used as verification information.

Instead of the client computer 14, the image forming apparatus 12 may execute processing for automatically identifying a specific page and processing for obtaining user information or biometric information as verification information. For instance, the image forming apparatus 12 receives a print request, together with print data, and then, a user logs in the image forming apparatus 12 by card authentication or biometric authentication, for example. In this case, the controller 20 detects a specific page from the print data, obtains login information, such as user information or biometric information, and executes decomposing processing to embed the login information as verification information into the specific page. Then, as in the above-described exemplary embodiment, the print engine 34 sends a request for verification information to the controller 20 when printing an output page including the specific page. Using login information as verification information allows a user to merely perform card authentication or biometric authentication when printing a specific page. For a user, inputting user information or biometric information is easier than inputting a security code. The above-described processing for automatically identifying a specific page and for obtaining user information or biometric information may be implemented through the execution of a program, as in the above-described exemplary embodiment.

In the above-described exemplary embodiment, when embedding a security code into bitmap data, information on the code size is embedded into the first byte and a security code is embedded into the second through tenth bytes. This configuration is only an example. For instance, the size of a security code may be preset, and the security code may be embedded into bitmap data starting from the first byte. To read the security code, the number of bytes for a length equal to the preset code size are read starting from the first byte.

In the above-described exemplary embodiment, data outside the print area at the head of decomposed bitmap data is overwritten with a security code, so that the security code can be embedded into the bitmap data. The location of bitmap data where a security code is embedded is not restricted to the above-described location. For example, instead of into the head of bitmap data, a security code may be embedded to another location outside the print area. A security code may be embedded into the inside of the print area instead of the outside of the print area.

Processing executed by the image forming apparatus 12 according to the above-described exemplary embodiment may be implemented by software, hardware, or a combination of software and hardware. Processing executed by the image forming apparatus 12 may be stored in a storage medium as a program and be distributed.

In the above-described exemplary embodiment, a CPU has been described as an example of a processor. However, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a processor configured to:
obtain print information including a setting of a predetermined specific page and predetermined verification information, the predetermined specific page being indicated by print data which is to be subjected to printing processing;
convert the print data into image data in a printable format for each output page;
embed the predetermined verification information into the image data of an output page including the predetermined specific page;
request a user to provide the verification information so as to obtain the verification information when printing the output page with the embedded verification information; and
execute printing processing if the embedded verification information and the obtained verification information match each other.

2. The image forming apparatus according to claim 1, wherein the processor is configured to embed the verification information outside a print area of the image data.

3. The image forming apparatus according to claim 2, wherein the processor is configured to embed the verification information by overwriting information at a start of the image data for a predetermined number of bytes.

4. The image forming apparatus according to claim 3, wherein the processor is configured to execute printing processing without obtaining the verification information from the user if the first byte of the image data is 0.

5. The image forming apparatus according to claim 4, wherein the processor is configured to obtain the verification information from the user and to check whether the embedded verification information and the obtained verification information match each other if the first byte of the image data is not 0.

6. The image forming apparatus according to claim 5, wherein the processor is configured to delete the image data if at least one of the number of times the user is requested to provide the verification information and a time elapsed from when the user is requested to provide the verification information is greater than or equal to a predetermined threshold.

7. The image forming apparatus according to claim 4, wherein the processor is configured to delete the image data if at least one of the number of times the user is requested to provide the verification information and a time elapsed from when the user is requested to provide the verification information is greater than or equal to a predetermined threshold.

8. The image forming apparatus according to claim 3, wherein the processor is configured to obtain the verification information from the user and to check whether the embedded verification information and the obtained verification information match each other if the first byte of the image data is not 0.

9. The image forming apparatus according to claim 8, wherein the processor is configured to delete the image data if at least one of the number of times the user is requested to provide the verification information and a time elapsed from when the user is requested to provide the verification information is greater than or equal to a predetermined threshold.

10. The image forming apparatus according to claim 3, wherein the processor is configured to delete the image data if at least one of the number of times the user is requested to provide the verification information and a time elapsed from when the user is requested to provide the verification information is greater than or equal to a predetermined threshold.

11. The image forming apparatus according to claim 2, wherein the processor is configured to delete the image data if at least one of the number of times the user is requested to provide the verification information and a time elapsed from when the user is requested to provide the verification information is greater than or equal to a predetermined threshold.

12. The image forming apparatus according to claim 1, wherein the processor is configured to delete the image data if at least one of the number of times the user is requested to provide the verification information and a time elapsed from when the user is requested to provide the verification information is greater than or equal to a predetermined threshold.

13. The image forming apparatus according to claim 1, wherein the processor is configured to postpone executing printing processing for the output page with the embedded verification information and to execute printing processing for an output page subsequent to the output page with the embedded verification information if matching of the embedded verification information and the obtained verification information is not performed even after a predetermined time has elapsed.

14. The image forming apparatus according to claim 1, wherein the processor is configured to identify the predetermined specific page by detecting predetermined information within the print data and to obtain user information for authenticating the user as the verification information.

15. The image forming apparatus according to claim 14, wherein the predetermined information is predetermined text or a predetermined mark placed at a predetermined position of the print data.

16. An image forming system comprising:
the image forming apparatus according to claim 1; and
an information processing apparatus that sends print data, which is to be subjected to printing processing, and the print information to the image forming apparatus and requests the image forming apparatus to execute printing processing.

17. The image forming system according to claim 16, wherein the information processing apparatus includes a processor configured to:
identify the predetermined specific page by detecting predetermined information within the print data;
obtain user information for authenticating the user as the predetermined verification information; and
execute processing, if the predetermined specific page is identified, to include a setting of the predetermined specific page and the predetermined verification information in the print information and to send the print information to the image forming apparatus when requesting the image forming apparatus to execute printing processing.

18. The image forming system according to claim 17, wherein the predetermined information is predetermined text or a predetermined mark placed at a predetermined position of the print data.

19. A non-transitory computer readable medium storing a program causing a computer to execute a process, the process comprising:
obtaining print information including a setting of a predetermined specific page and predetermined verification information, the predetermined specific page being indicated by print data which is to be subjected to printing processing;
converting the print data into image data in a printable format for each output page;
embedding the predetermined verification information into the image data of an output page including the predetermined specific page;
requesting a user to provide the verification information so as to obtain the verification information when printing the output page with the embedded verification information; and
executing printing processing if the embedded verification information and the obtained verification information match each other.

20. An image forming method comprising:
obtaining print information including a setting of a predetermined specific page and predetermined verification information, the predetermined specific page being indicated by print data which is to be subjected to printing processing;
converting the print data into image data in a printable format for each output page;
embedding the predetermined verification information into the image data of an output page including the predetermined specific page;
requesting a user to provide the verification information so as to obtain the verification information when printing the output page with the embedded verification information; and
executing printing processing if the embedded verification information and the obtained verification information match each other.

* * * * *